(12) United States Patent
Jigalur et al.

(10) Patent No.: US 12,105,597 B2
(45) Date of Patent: Oct. 1, 2024

(54) MIGRATION OF CONTROL PLANES ACROSS ARCHITECTURES

(71) Applicant: VMWARE, INC., Palo Alto, CA (US)

(72) Inventors: Pradeep Shanmukha Jigalur, Hubli (IN); Christopher John Schaefer, Venice, FL (US); Frances Gold, Eugene, OR (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/075,463

(22) Filed: Dec. 6, 2022

(65) Prior Publication Data

US 2024/0126659 A1    Apr. 18, 2024

(30) Foreign Application Priority Data

Oct. 13, 2022   (IN) .............................. 202241058479

(51) Int. Cl.
    *G06F 16/00*    (2019.01)
    *G06F 11/14*    (2006.01)

(52) U.S. Cl.
    CPC ...... *G06F 11/1458* (2013.01); *G06F 2201/84* (2013.01)

(58) Field of Classification Search
    CPC .. G06F 16/119; G06F 16/214; G06F 11/1458; G06F 2201/84
    USPC ................................................ 707/600–899
    See application file for complete search history.

(56) References Cited

U.S. PATENT DOCUMENTS

| | | | |
|---|---|---|---|
| 10,944,630 B2 * | 3/2021 | Patil | H04L 41/082 |
| 2011/0134931 A1 * | 6/2011 | Merwe | H04L 41/0843 |
| | | | 370/401 |
| 2020/0073763 A1 * | 3/2020 | Saini | G06F 11/1469 |
| 2022/0413903 A1 * | 12/2022 | Kalley | G06F 9/5072 |
| 2023/0179655 A1 * | 6/2023 | Mustafa | H04L 67/1051 |
| | | | 714/4.1 |
| 2023/0325253 A1 * | 10/2023 | Hasti | G06F 9/5072 |
| | | | 718/102 |

* cited by examiner

*Primary Examiner* — Michelle N Owyang
(74) *Attorney, Agent, or Firm* — King Intellectual Asset Management

(57) ABSTRACT

The disclosure provides migration of control plane nodes across multiple architecture platforms. Embodiments include one or more processors configured to backup data of a source control plane node running on a first host, the first host having a first architecture platform, identify a second architecture platform of a second host, the second architecture platform being different than the first architecture platform, select a first control plane binary of a plurality of control plane binaries based on the first control plane binary being for the second architecture platform, wherein the plurality of control plane binaries are for a plurality of architecture platforms, deploy a target control plane node on the second host using the selected first control plane binary, copy the backed up data to the second host to configured the target control plane node, and run the target control plane node on the second host.

20 Claims, 3 Drawing Sheets

MIGRATION OF CONTROL PLANES ACROSS ARCHITECTURES

RELATED APPLICATIONS

Benefit is claimed under 35 U.S.C. 119(a)-(d) to Foreign Application Serial No. 202241058479 filed in India entitled "MIGRATION OF CONTROL PLANES ACROSS ARCHITECTURES", on Oct. 13, 2022, by VMware, Inc., which is herein incorporated in its entirety by reference for all purposes.

BACKGROUND

A software-defined data center (SDDC) may comprise a plurality of hosts in communication over a physical network infrastructure. Each host is a physical computer (machine) that may run one or more virtualized endpoints such as virtual machines (VMs), containers, and/or other virtual computing instances (VCIs). In some cases, VCIs are connected to software-defined networks (SDNs), also referred to herein as logical overlay networks, that may span multiple hosts and are decoupled from the underlying physical network infrastructure.

SDN involves the use of a management plane (MP) and a control plane (CP). The management plane is responsible for receiving network configuration input from, for example, an administrator and generating desired state data that specifies how the logical overlay network should be implemented in the physical infrastructure. The control plane is responsible for determining the logical overlay network topology and maintaining information about network entities such as logical switches, logical routers, endpoints, etc. The logical topology information is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference. The CP functionality may be implemented as one or more control plane nodes in a data center. The control plane nodes may be physical machines configured to perform CP functions, or may be VCIs configured to run on hosts and perform CP functions.

In some cases, a customer may utilize multiple architecture platforms across one or more data centers, such as across multiple cloud data centers, within a single data center, across different types (e.g., on prem, cloud, hybrid, etc.) data centers, across different data centers of the same type, etc. For example, an architecture platform may refer to a processor architecture, such as ARM or x86. Accordingly, the customer may utilize hosts having different architecture platforms. As part of utilizing multiple architecture platforms, a customer may need to migrate a control plane node from running on a host having a first architecture platform, such as x86 based processor(s), to a host having a second architecture platform, such as ARM based processor(s). As such, to achieve a multi-architecture strategy, control plane nodes need to be migrated across architectures in an automated way. The term "migration" may refer to the process of moving an entire running virtual machine from one physical host to another host, such as without disrupting normal operation or causing any down time or other adverse effects for the users. In an example, the term "architecture" may refer to an instruction set for computer processors. However, conventional systems and methods do not allow such migration of control plane nodes from one architecture to another in an automated way.

It should be noted that the information included in the Background section herein is simply meant to provide a reference for the discussion of certain embodiments in the Detailed Description. None of the information included in this Background should be considered as an admission of prior art.

SUMMARY

Embodiments provide a method of migration of control plane nodes across multiple architecture platforms including receiving mitigation specification directed to migration of control plane nodes across multiple architecture platforms, backing-up data of source control plane node associated with a first architecture platform, scanning a source control plane node, identifying properties of the source control plane node, scanning a target control plane node associated with a second architecture platform, the second architecture platform is different from the first architecture platform, identifying properties of the target control plane node, deploying the target control plane node by applying identified properties of the source control plane node, restoring backed-up data of the source control plane node onto the target control plane node, triggering reconciliation of the target control plane node, and turning off the source control plane node.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

The following detailed description of the present disclosure may be better understood when read in conjunction with the following drawings in which.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides techniques for migration of control plane nodes across different architecture platforms. For example, embodiments described herein allow for migration of control plane nodes across different architecture platforms in an automated way. For example, a migration orchestrator, as described herein, enables migration across data centers, such as across different cloud providers, or within a data center. Accordingly, in an example, the migration orchestrator can enable a multi-cloud migration strategy, allowing customers the flexibility to easily move their systems across different providers or infrastructures. In certain embodiments, migration orchestrator may be deployed in a data center including a source host from which the control plane node is being migrated or in a data center including a target host to which the control plane node is being migrated. In some embodiments, migration orchestrator may be outside of either such data center. The migration orchestrator is in network communication with the source host and target host to facilitate the migration of the control plane node from the source host to the target host.

Figure 1:
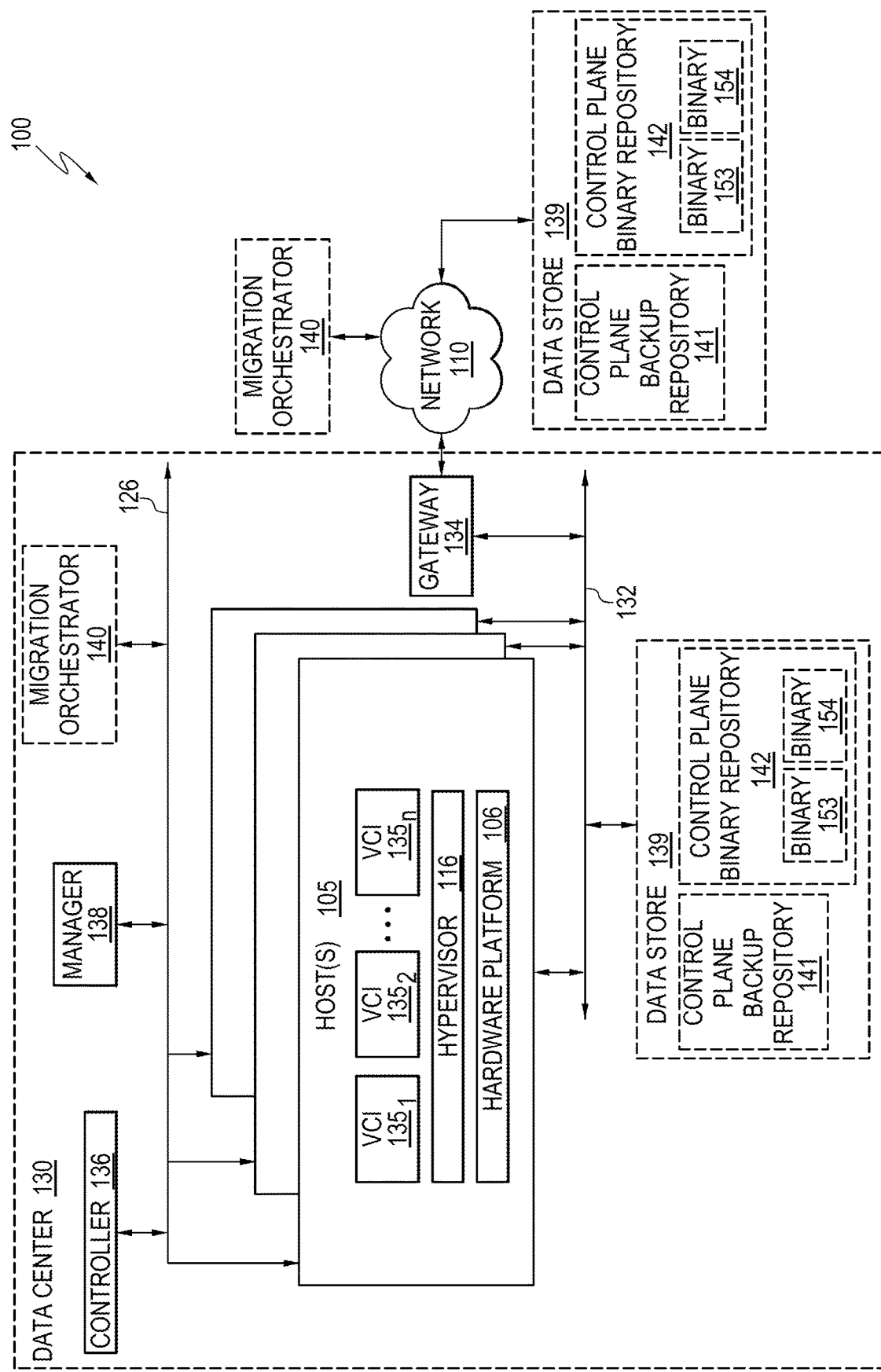
FIG. 1 depicts an example of physical and virtual computing components with which embodiments of the present disclosure may be implemented.

FIG. 1 depicts an example of physical and virtual computing components with which embodiments of the present disclosure may be implemented.

Referring to FIG. 1, networking environment 100 includes data center 130 and network 110. Network 110 is generally representative of a network of machines such as a local area network ("LAN") or a wide area network ("WAN"), a network of networks, such as the Internet, or any connection over which data may be transmitted.

Data center 130 generally represents a set of networked physical machines (e.g., host(s) 105), and may implement a logical overlay network that connects some VCIs running on the physical machines. Data center 130 includes host(s) 105, a gateway 134, a data network 132, which may be a Layer 3 network, and a management network 126. Host(s) 105 may be an example of machines. Data network 132 and management network 126 may be separate physical networks or different virtual local area networks (VLANs) on the same physical network.

It is noted that, while not shown, additional data centers may also be connected to data center 130 via network 110.

Each of hosts 105 may include a server grade hardware platform 106, such as an x86 architecture platform or an ARM architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 for multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like.

In some embodiments, hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some embodiments, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine.

Gateway 134 provides VCIs 135 and other components in data center 130 with connectivity to network 110, and is used to communicate with destinations external to data center 130, such as another data center, data store 139, and/or migration orchestrator 140. Gateway 134 may be implemented as one or more VCIs, physical devices, and/or software modules running within one or more hosts 105.

Controller 136 generally represents a control plane that manages configuration of VCIs 135 within data center 130. Controller 136 is an example of a control plane node. Controller 136 may be a computer program that resides and executes in a central server in data center 130 or, alternatively, controller 136 may run as a virtual appliance (e.g., a VM) in one of hosts 105. Although shown as a single unit/control plane node, it should be understood that controller 136 may be implemented as a distributed or clustered system including multiple control plane nodes. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 138 is a computer program that executes in a central server in networking environment 100, or alternatively, manager 138 may run in a VM, e.g. in one of hosts 105. Manager 138 is configured to receive inputs from an administrator or other entity, e.g., via a web interface or API, and carry out administrative tasks for data center 130, including centralized network management and providing an aggregated system view for a user.

Data store 139 is a data store for storing data, such as data associated with control plane nodes. Data store 139 is any suitable storage, such as a storage area network (SAN), virtual SAN (VSAN), network accessible storage (NAS), host coupled storage, etc. In certain aspects, data store 139 is within data center 130, such as coupled to data network 132 as shown. In certain aspects, data store 139 is outside of data center 130, such as coupled to network 110 as shown, or in another data center.

Data store 139 may include control plane backup repository 141 and control plane binary repository 142. Control plane backup repository 141 represents a portion of data store 139 that stores control plane node data of control plane nodes backed up to data store 139. In particular, as discussed, a control plane node may be migrated or moved from a source host 105 to a target host 105. As part of the process, as further discussed herein, data of the control plane node as running on the source host 105 is backed up to data store 139. In certain aspects, control plane node data includes state information and data regarding the operational state of the control plane when backed up, such as configuration information, settings, properties, metadata, files, etc.

Control plane binary repository 142 represents a portion of data store 139 that stores control plane binaries, which may be binaries including files and/or data needed to instantiate a control plane node in a default configuration. Control plane binary repository 142 may include different control plane binaries for different architecture platforms. In some embodiments, control plane binary repository 142 may include first control plane binary 153 and second control plane binary 154. First control plane binary 153 includes code to instantiate a control plane node configured to execute on a first architecture platform, such as x86. Second control plane binary 154 includes code to instantiate a control plane node configured to execute on a second architecture platform, such as ARM.

Migration orchestrator 140 generally represents one or more components that migrate control plane nodes from a first architecture platform to a second architecture platform. For example, as described in more detail below with respect to FIGS. 2-3, migration orchestrator 140 may migrate control plane nodes between an x86 architecture platform and an ARM architecture platform. In certain embodiments, migration orchestrator 140 is deployed in data center 130, such as directly on a physical machine or on a VCI, which may be coupled to management network 126. In some embodiments, migration orchestrator 140 may be deployed outside of data center 130 such as connected to network 110 or in another data center. In an example, data center 130 may represent a data center including a source control plane node or a target control plane node. In an example, another data center similar to data center 130 may be coupled to network 110 and may represent a data center including a source control plane node or a target control plane node. For example, a control plane node may be migrated to data center 130 from another data center, may be migrated to another data center from data center 130, or migrated between hosts within data center 130.

Figure 2:
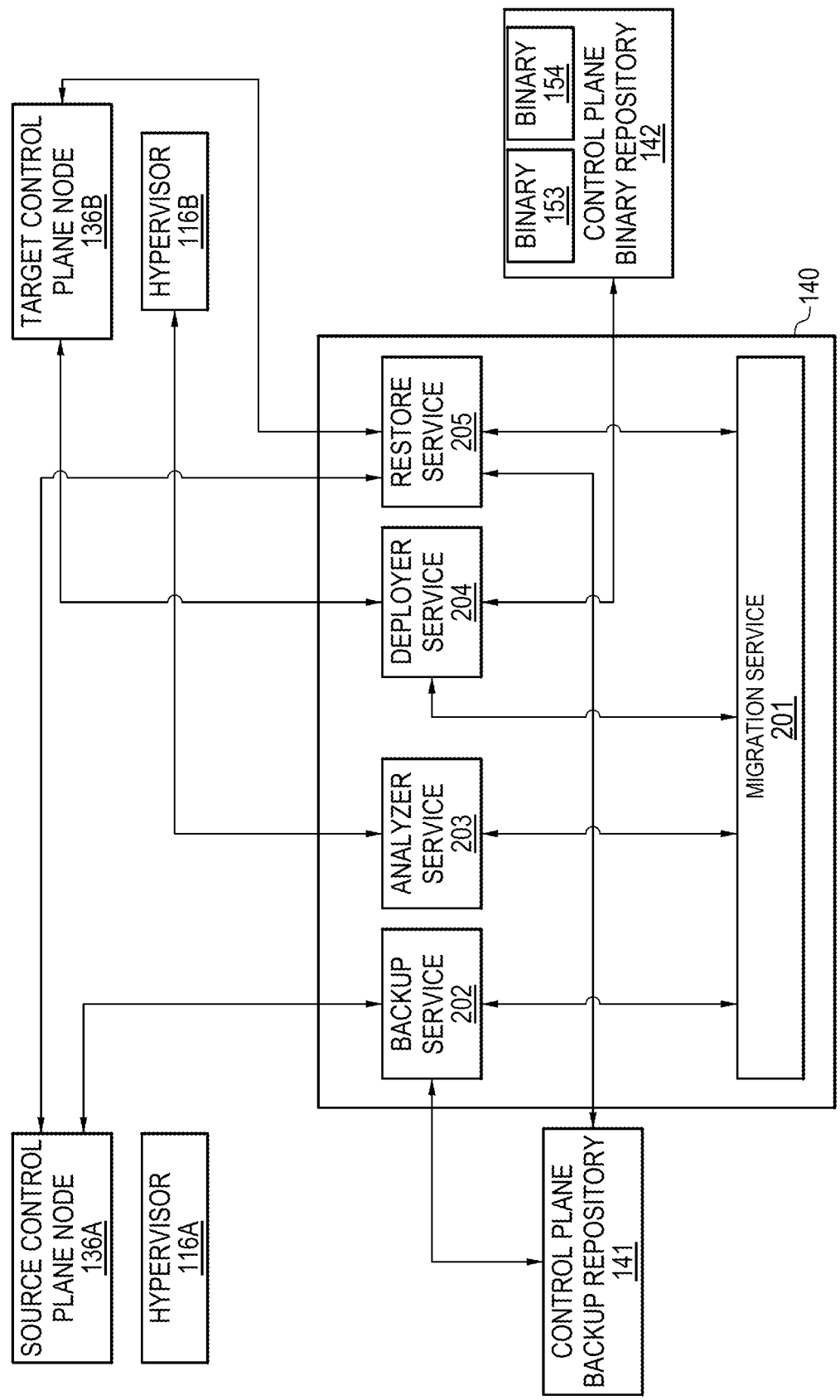
FIG. 2 depicts an example migration orchestrator of FIG. 1, according to embodiments of the present disclosure.

FIG. 2 depicts an example migration orchestrator of FIG. 1, according to embodiments of the present disclosure.

Referring to FIG. 2, as described above, migration orchestrator 140 is configured to migrate control plane nodes from a first architecture platform to a second architecture platform. The second architecture platform is different from the first architecture platform. In particular, in certain embodiments, migration orchestrator 140 is configured to migrate or move a control plane node from running on a first host 105 to a second host 105. The first host 105 may implement the first architecture platform, such as having an x86 processor and a hypervisor 116 configured to execute on an x86 processor. The second host 105 may implement the second architecture platform, such as having an ARM processor and a hypervisor 116 configured to execute on an ARM processor. Migration orchestrator 140 may include migration service 201, backup service 202, analyzer service 203, deployer service 204, restore service 205, or combinations thereof.

Figure 3:
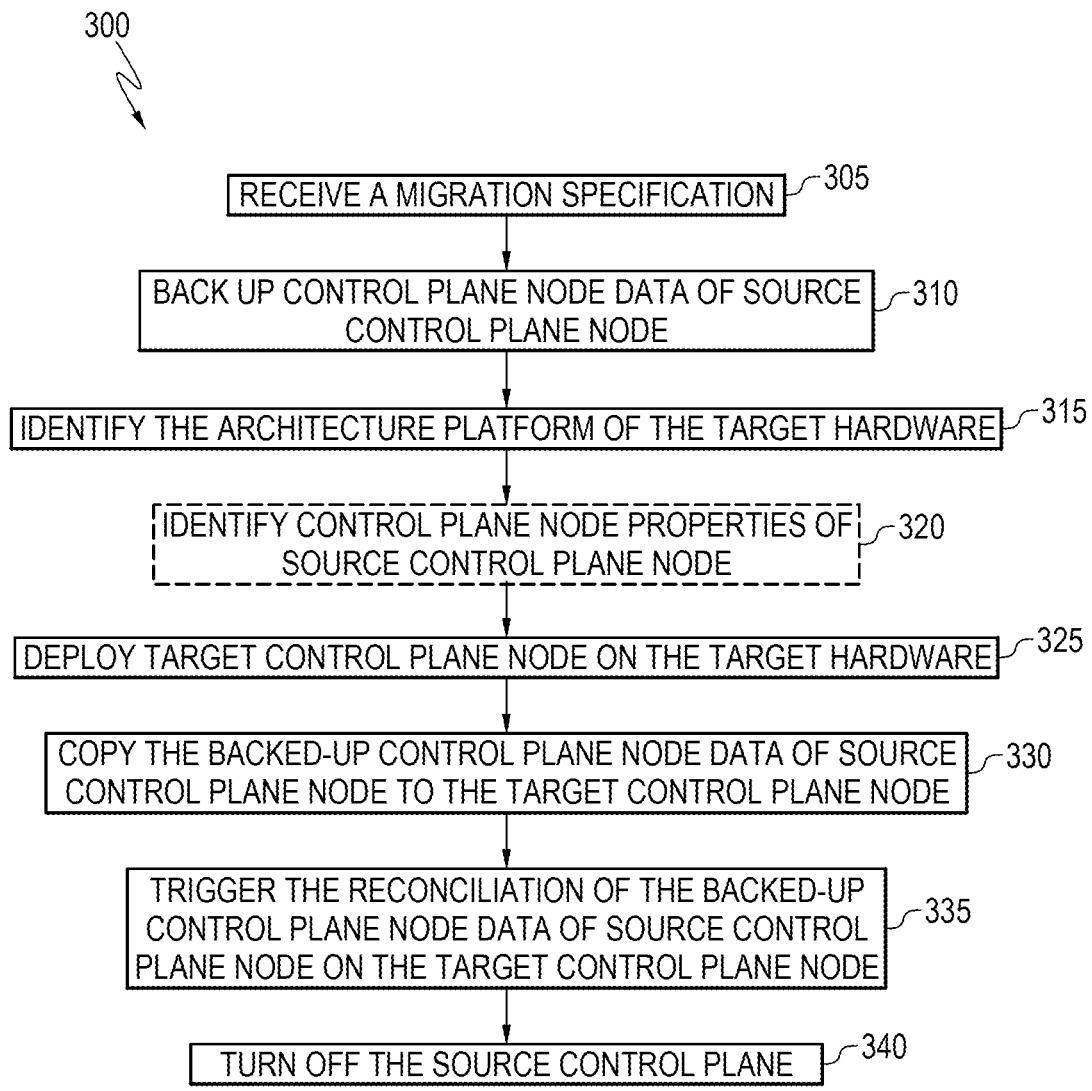
FIG. 3 depicts example operations related to control plane node migration across architectures, according to embodiments of the present disclosure.

FIG. 3 depicts example operations 300 for migrating a control plane node across architecture platforms, according to embodiments of the present disclosure. Certain aspects are discussed in conjunction with both FIGS. 2 and 3. In certain aspects, migration orchestrator 140 is configured to perform operations 300, as discussed herein.

At step 305, migration service 201 receives a migration specification, such as from an administrator of an SDDC. The migration specification may indicate that one or more components of an SDDC are to be migrated from a source system to a destination system, such as from one or more hosts in a first data center, to one or more different hosts in a second data center. For example, the migration specification may indicate to migrate a source control plane node 136A from a first host running a first hypervisor 116A to a target control plane node 136B on a second host running a second hypervisor 116B. Migration service 201 may be configured to coordinate operations performed by backup service 202, analyzer service 203, deployer service 204, and restore service 205 to effectuate the migration detailed in the migration specification.

At step 310, backup service 202 backs up control plane node data of source control plane node 136A, such as to control plane backup repository 141 of data store 139. Control plane backup repository 141 may be separate from the first host 105 and the second host 105. For example, based on the receipt of the migration specification, migration service 201 is configured to call backup service 202. Backup service 202 is configured to take a live or current backup of control plane node data, such as by requesting (e.g., over a network) such data from source control plane node 136A, or from first hypervisor 116A on which source control plane node 136A runs. For example, first hypervisor 116A may provide data stored on one or more virtual disks (e.g., backed by physical disks on the host running first hypervisor 116A and source control plane node 136A) of source control plane node 136A. Backup service 202 may then send the received data to control plane backup repository 141 of data store 139 for storage.

At step 315, analyzer service 203 identifies the architecture platform of the target hardware (e.g., second host running the second hypervisor 116B). For example, based on the receipt of the migration specification, migration service 201 is configured to call analyzer service 203. Analyzer service 203 is configured to scan the second host to identify the second architecture platform, such as an ARM architecture. In certain aspects, analyzer service 203 does so by querying second hypervisor 116B running on the second host.

Optionally, in certain aspects, at step 320, analyzer service 203 further identifies control plane node properties of source control plane node 136A. For example, based on the receipt of the migration specification, migration service 201 is configured to call analyzer service 203. Analyzer service 203 is configured to scan the source control plane node 136A to identify control plane node properties of source control plane node 136A. Example control plane node properties include build number, version, custom resource sizing plans, and/or other identifiers. In certain aspects, analyzer service 203 does so by querying first hypervisor 116A running on the first host.

At step 325, deployer service 204 deploys target control plane node 136B on the target hardware, such as on second hypervisor 116B running on the second host. In certain aspects, deployer service 204 is configured to select/identify which binary in control plane binary repository 142 to use for deploying target control plane node 136B based on the identified architecture platform of the target hardware. For example, control plane binary repository 142 may include first control plane binary 153 including code to instantiate a control plane node configured to execute on a first architecture platform, such as x86, and second control plane binary 154 includes code to instantiate a control plane node configured to execute on a second architecture platform, such as ARM. Accordingly, if the identified architecture platform of the target hardware is x86, deployer service 204 may select first control plane binary 153 to deploy target control plane node 136B on the target hardware. Alternatively, if the identified architecture platform of the target hardware is ARM, deployer service 204 may select second control plane binary 154 to deploy target control plane node 136B on the target hardware.

In certain aspects, deployer service 204 is configured to initially deploy the target control plane node 136B on the target hardware in a default state using the selected binary, meaning without being configured on the target hardware. In certain aspects, deployer service 204 is configured to apply the identified control plane node properties of source control plane node 136A to the target control plane node 136B on the target hardware.

At step 330, restore service 205 copies the backed-up control plane node data of source control plane node 136A to the target control plane node 136B (e.g., to the target hardware), such as from the control plane backup repository 141 of data store 139. For example, based on the receipt of the migration specification, migration service 201 is configured to call restore service 205. Restore service 205 is configured to take backed-up control plane node data of the source control plane node 136A, such as by requesting (e.g., over a network) such data from the control plane backup repository 141. Restore service 205 is then configured to perform consistency and verification checks of backed-up control plane node data of the source control plane node 136A, such as by checking checksum files, etc. Restore service 205 may then copy the control plane node data of the source control plane node 136A to the target hardware running the target control plane node 136B, to be used for restoring the functionality and state of source control plane node 136A to target control plane node 136B.

At step 335, restore service 205 triggers the reconciliation of the backed-up control plane node data of source control plane node 136A on the target control plane node 136B. The term "reconciliation" may refer to a process of determining the actual state of the control plane node and taking actions based on the difference between the actual and the expected states. For example, to utilize the backed-up control plane node data of source control plane node 136A on the target control plane node 136B, restore service 205 is configured to install, upgrade, and repair the backed-up control plane node data of source control plane node 136A. For example, the reconciliation process may change the properties of backed-up control plane node data of source control plane node 136A, such as adding new nodes, or enable/disable features. When the backed-up control plane node data of source control plane node 136A get reconciled, the target control plane node 136B may be ready to use and run on the hypervisor 116B of second host 105.

At step 340, restore service 205 turns off the source control plane node 136A, such as by requesting (e.g., over a network) first host 105 (e.g., first hypervisor 116A) to stop the source control plane node 136A. For example, after deploying the target control plane node 136B on the second host 105, restore service 205 may stop the source control plane node 136A running on the first host 105.

The various embodiments described herein may employ various computer-implemented steps involving data stored in computer systems. For example, these steps may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any steps described herein that form part of one or more embodiments of the present disclosure may be useful machine operations. In addition, one or more embodiments of the present disclosure also relate to a device or an apparatus for performing these steps. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required steps.

The various embodiments described herein may be practiced with other computer system configurations including hand-held devices, microprocessor systems, microprocessor-based or programmable consumer electronics, minicomputers, mainframe computers, and/or the like.

One or more embodiments of the present disclosure may be implemented as one or more computer programs or as one or more computer program modules embodied in one or more computer readable media. The term computer readable medium refers to any data storage device that can store data which can thereafter be input to a computer system—non-transitory computer readable medium may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization steps may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the present disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A system comprising:
one or more processors; and
a non-transitory computer readable medium storing instructions executable by the one or more processors to cause the system to perform operations comprising:
receiving, from a first hypervisor running on a first host having a first architecture platform, backup data of a source control plane node running on a first host, the first control plane node comprising a virtual computing instance (VCI) running on the first host and supported by the first hypervisor, the backup data comprising state information regarding an operational state of the control plane node when backed up;
identifying a second architecture platform of a second host, the second architecture platform being different than the first architecture platform;
selecting a first control plane binary of a plurality of control plane binaries based on the first control plane binary being targeted to the second architecture platform, each of the plurality of control plane binaries being targeted to one of a plurality of architecture platforms;
deploying, using the selected first control plane binary, a target control plane node on the second host, the target control plane node comprising a second VCI supported by a second hypervisor running on the second host;
copying at least a portion of the backup data, including at least some of the state information, to the second host to configure the target control plane node; and
running the target control plane node on second hypervisor on the second host.

2. The system of claim 1, the operations further comprising storing data in a control plane backup repository separate from the first host and the second host.

3. The system of claim 1, the operations further comprising stopping the source control plane node running on the first host after deploying the target control plane node on the second host.

4. The system of claim 1, wherein deploying the target control plane node comprises:
initially deploying the target control plane node in a default state that differs from the configured state of the source control plane node running on the first host.

5. The system of claim 4, wherein deploying the target control plane node further comprises:
applying properties of the source control plane node to the target control plane node, wherein the properties of the source control plane node comprise build number, version, custom resource sizing plans, or combinations thereof.

6. The system of claim 1, the operations further comprising reconciling services of the target control plane node with the backed up data.

7. The system of claim 1, wherein the first architecture platform is x86 architecture platform, and wherein the second architecture platform is an Advanced Reduced Instruction Set Computer (RISC) Machines (ARM) architecture platform.

8. A method for migrating control plane nodes, the method comprising:
receiving, from a first hypervisor running on a first host having a first architecture platform, backup data of a source control plane node running on a first host, the first control plane node comprising a virtual computing instance (VCI) running on the first host and supported by the first hypervisor, the backup data comprising state information regarding an operational state of the control plane node when backed up;
identifying a second architecture platform of a second host, the second architecture platform being different than the first architecture platform;
selecting a first control plane binary of a plurality of control plane binaries based on the first control plane binary being targeted to the second architecture platform, each of the plurality of control plane binaries being targeted to one of a plurality of architecture platforms;
deploying, using the selected first control plane binary, a target control plane node on the second host, the target control plane node comprising a second VCI supported by a second hypervisor running on the second host;
copying at least a portion of the backup data, including at least some of the state information, to the second host to configure the target control plane node; and
running the target control plane node on the second hypervisor on the second host.

9. The method of claim 8, wherein backing up the data comprises storing the backed up data in a control plane backup repository separate from the first host and the second host.

10. The method of claim 8, further comprising stopping the source control plane node running on the first host after deploying the target control plane node on the second host.

11. The method of claim 8, wherein deploying the target control plane node comprises:

initially deploying the target control plane node in a default state that differs from the configured state of the source control plane node running on the first host.

12. The method of claim 11, wherein deploying the target control plane node comprises:

applying properties of the source control plane node to the target control plane node, wherein the properties of the source control plane node comprise build number, version, custom resource sizing plans, or combinations thereof.

13. The method of claim 8, further comprising reconciling services of the target control plane node with the backed up data.

14. The method of claim 8, wherein the first architecture platform is x86 architecture platform, and wherein the second architecture platform is an Advanced Reduced Instruction Set Computer (RISC) Machines (ARM) architecture platform.

15. A non-transitory computer readable medium storing instructions, which when executed by at least one processor, cause the at least one processor to perform operations comprising:

receiving, from a first hypervisor running on a first host having a first architecture platform, backup data of a source control plane node running on a first host, the first control plane node comprising a virtual computing instance (VCI) running on the first host and supported by the first hypervisor, the backup data comprising state information regarding an operational state of the control plane node when backed up;

identifying a second architecture platform of a second host, the second architecture platform being different than the first architecture platform;

selecting a first control plane binary of a plurality of control plane binaries based on the first control plane binary being targeted to the second architecture platform, each of the plurality of control plane binaries being targeted to one of a plurality of architecture platforms;

deploying, using the selected first control plane binary, a target control plane node on the second host, the target control plane node comprising a second VCI supported by a second hypervisor running on the second host;

copying at least a portion of the backup data, including at least some of the state information, to the second host to configure the target control plane node; and running the target control plane node on the second hypervisor on the second host.

16. The non-transitory computer readable medium of claim 15, wherein backing up the data comprises storing the backed up data in a control plane backup repository separate from the first host and the second host.

17. The non-transitory computer readable medium of claim 15, wherein the operations further comprise stopping the source control plane node running on the first host after deploying the target control plane node on the second host.

18. The non-transitory computer readable medium of claim 15, wherein deploying the target control plane node comprises:

initially deploying the target control plane node in a default state that differs from the configured state of the source control plane node running on the first host.

19. The non-transitory computer readable medium of claim 18, wherein deploying the target control plane node comprises:

applying properties of the source control plane node to the target control plane node, wherein the properties of the source control plane node comprise build number, version, custom resource sizing plans, or combinations thereof.

20. The non-transitory computer readable medium of claim 15, wherein the operations further comprise reconciling services of the target control plane node with the backed up data.

* * * * *